(12) United States Patent
Jin et al.

(10) Patent No.: US 10,296,210 B2
(45) Date of Patent: May 21, 2019

(54) ELECTRONIC DEVICE AND OPERATING METHOD THEREOF

(71) Applicant: Samsung Electronics Co., Ltd., Gyeonggi-do (KR)

(72) Inventors: Myoung-Dae Jin, Gyeonggi-do (KR); Taewoo Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/398,190

(22) Filed: Jan. 4, 2017

(65) Prior Publication Data
US 2017/0192599 A1 Jul. 6, 2017

(30) Foreign Application Priority Data

Jan. 4, 2016 (KR) .................. 10-2016-0000388

(51) Int. Cl.
*G06F 1/16* (2006.01)
*G04D 99/00* (2006.01)
(Continued)

(52) U.S. Cl.
CPC ........ *G06F 3/04883* (2013.01); *A63F 13/217* (2014.09); *A63F 13/2145* (2014.09);
(Continued)

(58) Field of Classification Search
CPC .............. G06F 3/0416; G06F 3/04845; G06F 3/04883; G06F 1/163; G06F 1/1626;
(Continued)

(56) References Cited

U.S. PATENT DOCUMENTS

| 5,856,822 | A | * | 1/1999 | Du | G06F 3/03547 345/157 |
| 7,310,083 | B2 | * | 12/2007 | Hagiwara | G06F 3/03548 200/5 R |

(Continued)

FOREIGN PATENT DOCUMENTS

EP 2960754 12/2015

OTHER PUBLICATIONS

International Search Report dated Apr. 14, 2017 issued in counterpart application No. PCT/KR2017/000088, 10 pages.
(Continued)

*Primary Examiner* — Prabodh M Dharia
(74) *Attorney, Agent, or Firm* — The Farrell Law Firm, P.C.

(57) ABSTRACT

An electronic device is provided which includes a housing, a first plate, a second plate, and a side member, a touch screen display that includes a touch panel, the touch screen display located within the housing and exposed through at least a part of the first plate, a sensor within the housing and configured to detect an atmospheric pressure variation, a processor electrically connected with the touch screen display and the sensor, and a memory electrically connected to the processor, the memory stores instructions which when executed by the processor, cause the processor to receive a touch input caused by pressing a part of the touch screen display by using the touch screen display, monitor the atmospheric pressure variation using the sensor while receiving the touch input, and provide a changed and/or selected function of the touch screen display based on the monitored atmospheric pressure variation and the touch input.

15 Claims, 13 Drawing Sheets

(51) Int. Cl.
*G06F 3/147* (2006.01)
*A63F 13/217* (2014.01)
*A63F 13/803* (2014.01)
*G06F 3/0484* (2013.01)
*G06F 3/0488* (2013.01)
*A63F 13/2145* (2014.01)

(52) U.S. Cl.
CPC ........... *A63F 13/803* (2014.09); *G04D 99/00* (2013.01); *G06F 1/163* (2013.01); *G06F 1/1626* (2013.01); *G06F 1/1684* (2013.01); *G06F 3/04845* (2013.01); *G06F 3/147* (2013.01); *G06F 2203/04105* (2013.01); *G09G 2354/00* (2013.01)

(58) Field of Classification Search
CPC ......... G06F 1/1684; G06F 2203/04105; G04B 47/06; A63F 13/00
USPC ........ 345/1.3, 204–212, 419, 593, 633, 660, 345/690; 715/769; 361/679.09
See application file for complete search history.

(56) References Cited

U.S. PATENT DOCUMENTS

| | | | |
|---|---|---|---|
| 8,988,384 B2 | 3/2015 | Krah et al. | |
| 2004/0201578 A1* | 10/2004 | Sadahiro | G06F 1/1607 345/173 |
| 2009/0082961 A1* | 3/2009 | Tanaka | G01C 21/26 701/431 |
| 2009/0167698 A1* | 7/2009 | Altas | G06F 3/0488 345/173 |
| 2009/0256817 A1* | 10/2009 | Perlin | G06F 3/0233 345/174 |
| 2011/0050591 A1 | 3/2011 | Kim et al. | |
| 2012/0179969 A1* | 7/2012 | Lee | G06F 1/1626 715/719 |
| 2012/0249583 A1* | 10/2012 | Nishiyama | H04N 1/00129 345/629 |
| 2013/0113755 A1 | 5/2013 | Kwak et al. | |
| 2013/0127765 A1 | 5/2013 | Behdasht et al. | |
| 2013/0162262 A1* | 6/2013 | Johnson | G01R 31/021 324/539 |
| 2013/0257712 A1* | 10/2013 | Imamura | H01Q 1/243 345/156 |
| 2013/0257817 A1 | 10/2013 | Yliaho | |
| 2014/0002357 A1* | 1/2014 | Pombo | G06F 3/012 345/158 |
| 2014/0098076 A1* | 4/2014 | Yoon | H04N 21/4126 345/204 |
| 2014/0110059 A1 | 4/2014 | Huang et al. | |
| 2015/0084848 A1* | 3/2015 | Sharma | G06F 3/0383 345/156 |
| 2015/0128097 A1* | 5/2015 | Hyun | G06F 3/0488 715/863 |
| 2015/0199955 A1 | 7/2015 | Draganlc | |
| 2015/0205365 A1* | 7/2015 | Kakegawa | G06F 3/013 345/173 |
| 2015/0212647 A1* | 7/2015 | Kim | G02B 27/017 345/173 |
| 2015/0242987 A1* | 8/2015 | Lee | G06T 1/20 345/522 |
| 2015/0255023 A1* | 9/2015 | Lee | G09G 3/36 345/204 |
| 2015/0309609 A1 | 10/2015 | Wilson et al. | |
| 2015/0350393 A1 | 12/2015 | Midori | |
| 2016/0011662 A1* | 1/2016 | Tanaka | G06F 3/14 345/156 |
| 2016/0140893 A1* | 5/2016 | Bae | G06F 3/14 345/211 |
| 2016/0161252 A1* | 6/2016 | Yasui | G01C 5/06 702/166 |
| 2016/0162241 A1* | 6/2016 | An | G06F 3/1423 345/1.3 |
| 2016/0163174 A1* | 6/2016 | Zhang | G08B 21/0438 340/539.12 |
| 2016/0188086 A1* | 6/2016 | Yairi | G06F 3/0416 345/174 |
| 2016/0239194 A1* | 8/2016 | Hajj | H04M 1/72569 |
| 2016/0306426 A1* | 10/2016 | Modarres | G06F 3/0412 |
| 2016/0328078 A1* | 11/2016 | Lee | G06F 3/044 |
| 2016/0379605 A1* | 12/2016 | Morobishi | G09G 5/38 345/174 |
| 2017/0006149 A1* | 1/2017 | Namgoong | H04M 1/7253 |
| 2017/0293396 A1* | 10/2017 | Jung | G01L 7/12 |
| 2017/0336240 A1* | 11/2017 | Daneyshar | G01F 23/14 |

OTHER PUBLICATIONS

European Search Report dated Dec. 4, 2018 issued in counterpart application No. 17736083.1-1209, 9 pages.

* cited by examiner

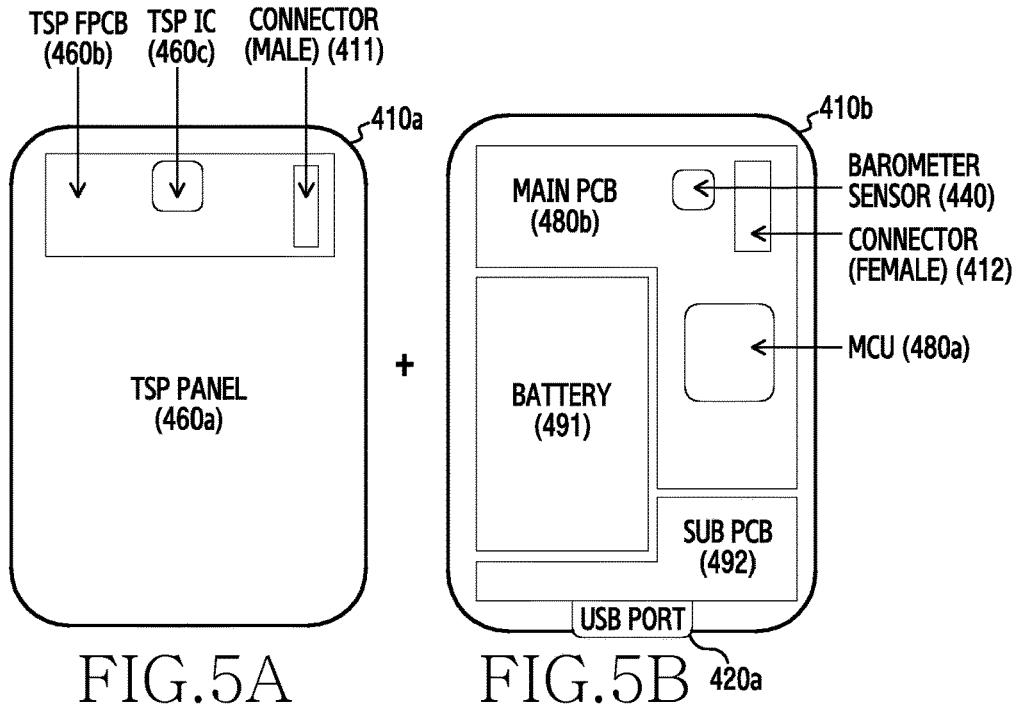
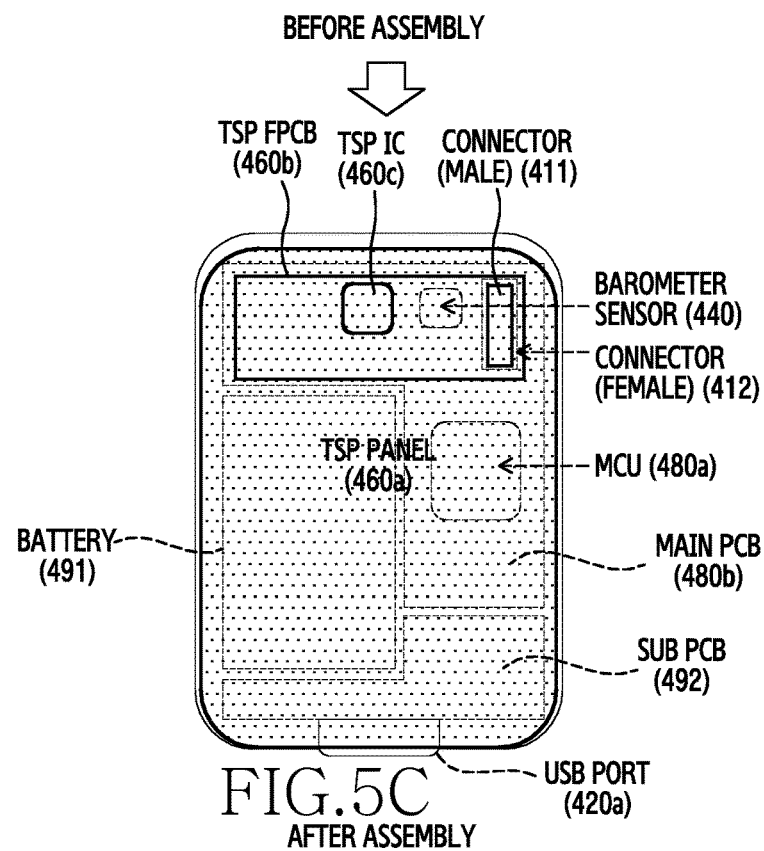
FIG.5A  FIG.5B
BEFORE ASSEMBLY
FIG.5C
AFTER ASSEMBLY

| REFERENCE VALUE<br>BAROMETER : 987.45 hpa<br>ALTITUDE : 217.06m<br>FIRST MEASUREMENT VALUE<br>BAROMETER : 991.77 hpa<br>ALTITUDE : 185m<br>VARIATION<br>Δ-32.06 | REFERENCE VALUE<br>BAROMETER : 988.01 hpa<br>ALTITUDE : 212.25m<br>FIRST MEASUREMENT VALUE<br>BAROMETER : 990.11 hpa<br>ALTITUDE : 194.48m<br>VARIATION<br>Δ-17.77 | REFERENCE VALUE<br>BAROMETER : 987.87 hpa<br>ALTITUDE : 213.43m<br>FIRST MEASUREMENT VALUE<br>BAROMETER : 992.43 hpa<br>ALTITUDE : 174.79m<br>VARIATION<br>Δ-38.64 |
|---|---|---|
| REFERENCE VALUE<br>BAROMETER : 987.92 hpa<br>ALTITUDE : 212.91m<br>FIRST MEASUREMENT VALUE<br>BAROMETER : 989.37 hpa<br>ALTITUDE : 200.72m<br>VARIATION<br>Δ-12.19 | REFERENCE VALUE<br>BAROMETER : 988.14 hpa<br>ALTITUDE : 211.01m<br>FIRST MEASUREMENT VALUE<br>BAROMETER : 990.57 hpa<br>ALTITUDE : 190.53m<br>VARIATION<br>Δ-20.48 | REFERENCE VALUE<br>BAROMETER : 988.21 hpa<br>ALTITUDE : 209.99m<br>FIRST MEASUREMENT VALUE<br>BAROMETER : 989.36 hpa<br>ALTITUDE : 201.01m<br>VARIATION<br>Δ-8.98 |
| REFERENCE VALUE<br>BAROMETER : 987.68 hpa<br>ALTITUDE : 215.09m<br>FIRST MEASUREMENT VALUE<br>BAROMETER : 989.03 hpa<br>ALTITUDE : 203.66m<br>VARIATION<br>Δ-11.43 | REFERENCE VALUE<br>BAROMETER : 987.92 hpa<br>ALTITUDE : 211.76m<br>FIRST MEASUREMENT VALUE<br>BAROMETER : 990.51 hpa<br>ALTITUDE : 195.22m<br>VARIATION<br>Δ-16.54 | REFERENCE VALUE<br>BAROMETER : 987.58 hpa<br>ALTITUDE : 215.37m<br>FIRST MEASUREMENT VALUE<br>BAROMETER : 990.13 hpa<br>ALTITUDE : 194.09m<br>VARIATION<br>Δ-21.28 |

FIG.8

ELECTRONIC DEVICE AND OPERATING METHOD THEREOF

PRIORITY

This application claims priority under 35 U.S.C. § 119(a) to Korean Patent Application Serial No. 10-2016-0000388, which was filed in the Korean Intellectual Property Office on Jan. 4, 2016, the entire content of which is incorporated herein by reference.

BACKGROUND

1. Field of the Disclosure

The present disclosure generally relates to an electronic device, and more particularly, to an electronic device having a touch screen and an operating method thereof.

2. Description of the Related Art

Electronic devices having touch screens may perform specific functions based on touch inputs generated on the touch screens. Electronic devices may detect the coordinates of the locations where the touch inputs are generated and may execute applications allocated to the detected coordinates. Furthermore, as touch screens have become larger in size, electronic devices have been used for notepads, image editing, and the like to create information on the touch screens and to store the same therein.

Electronic devices may perform functions corresponding to the locations of touch inputs generated on their touch screens, but may have difficulty in performing various functions according to the magnitudes of pressure corresponding to the touch inputs.

SUMMARY

Various aspects of the present disclosure provide an electronic device and operating method thereof, the electronic device identifies the strength of a touch input, which is generated on the electronic device that is closed tightly so that no air may get in or out, detects an atmospheric pressure variation for the touch input and performs various functions based on the identified strength of the touch input.

According to another aspect of the present disclosure, an electronic device and operating method thereof identifies an atmospheric pressure variation for a touch input generated on an airtight electronic device using a sensor within the electronic device, identifies the strength of the touch input using the identified atmospheric pressure variation, and performs various functions based on the identified strength of the touch input, thereby enhancing convenience of use.

According to another aspect of the present disclosure, an electronic device and operating method thereof use an atmospheric pressure sensor included in the electronic device to waterproof the electronic device and to prevent damage to the external appearance of the electronic device, which may be caused by an increase in the thickness of the electronic device.

Accordingly an aspect of the present disclosure provides an electronic device which includes a housing that includes a first plate extending in a first direction, a second plate extending in a second direction opposite to the first direction, and a side member configured to surround the space between the first plate and the second plate, wherein the side member is partially integrated with the first or second plate, or is separated from the first or second plate, a touch screen display that includes a touch panel, the touch screen display being located within the housing and exposed through at least a part of the first plate, a sensor provided within the space of the housing and configured to detect an atmospheric pressure variation, a processor electrically connected with the touch screen display and the sensor, a memory electrically connected to the processor, and the memory may store instructions which when executed the processor, cause the processor to receive a touch input caused by pressing a part of the touch screen display, monitor the atmospheric pressure variation using the sensor while receiving the touch input, and provide a changed and/or selected function of the touch screen display based at least in part on the monitored atmospheric pressure variation and the touch input.

Another aspect of the present disclosure provides a method of operating an electronic device which includes receiving, by the electronic device, a touch input caused by pressing a part of a touch screen display, wherein the electronic device includes a housing having an inner space, the touch screen display exposed through one surface of the housing, and a sensor configured to detect an atmospheric pressure variation within the inner space, monitoring, by the electronic device, the atmospheric pressure variation using the sensor while receiving the touch input, and providing, by the electronic device, a changed and/or selected function of the touch screen display based at least in part on the monitored atmospheric pressure variation and the touch input.

Another aspect of the present disclosure provides an electronic device which includes a housing that includes a first plate extending in a first direction, a second plate extending in a second direction opposite to the first direction, and a side member configured to surround the space between the first plate and the second plate, wherein the side member is partially integrated with the first or second plate, or is separated from the first or second plate, a connecting member connected to the housing and detachably mounted on a part of a user's body, a touch screen display that includes a touch panel, the touch screen display being located within the housing and exposed through at least a part of the first plate, an atmospheric pressure sensor provided within the space of the housing and configured to detect an atmospheric pressure variation, a processor electrically connected with the touch screen display and the atmospheric pressure sensor, and a memory electrically connected with the processor, the memory may store instructions, which when executed by the processor, cause the processor to receive a touch input caused by pressing a part of the touch screen display, and monitor the atmospheric pressure variation using the atmospheric pressure sensor while receiving the touch input.

BRIEF DESCRIPTION OF THE DRAWINGS

The above and other aspects, features, and advantages of the present disclosure will be more apparent from the following detailed description taken in conjunction with the accompanying drawings, in which:

FIGS. 5A-5C illustrate an arrangement of elements of an electronic device, according to an embodiment of the present disclosure;

FIG. 8 illustrates threshold values allocated to areas of the virtually divided touch panel, according to an embodiment of the present disclosure;

DETAILED DESCRIPTION

Figure 1:
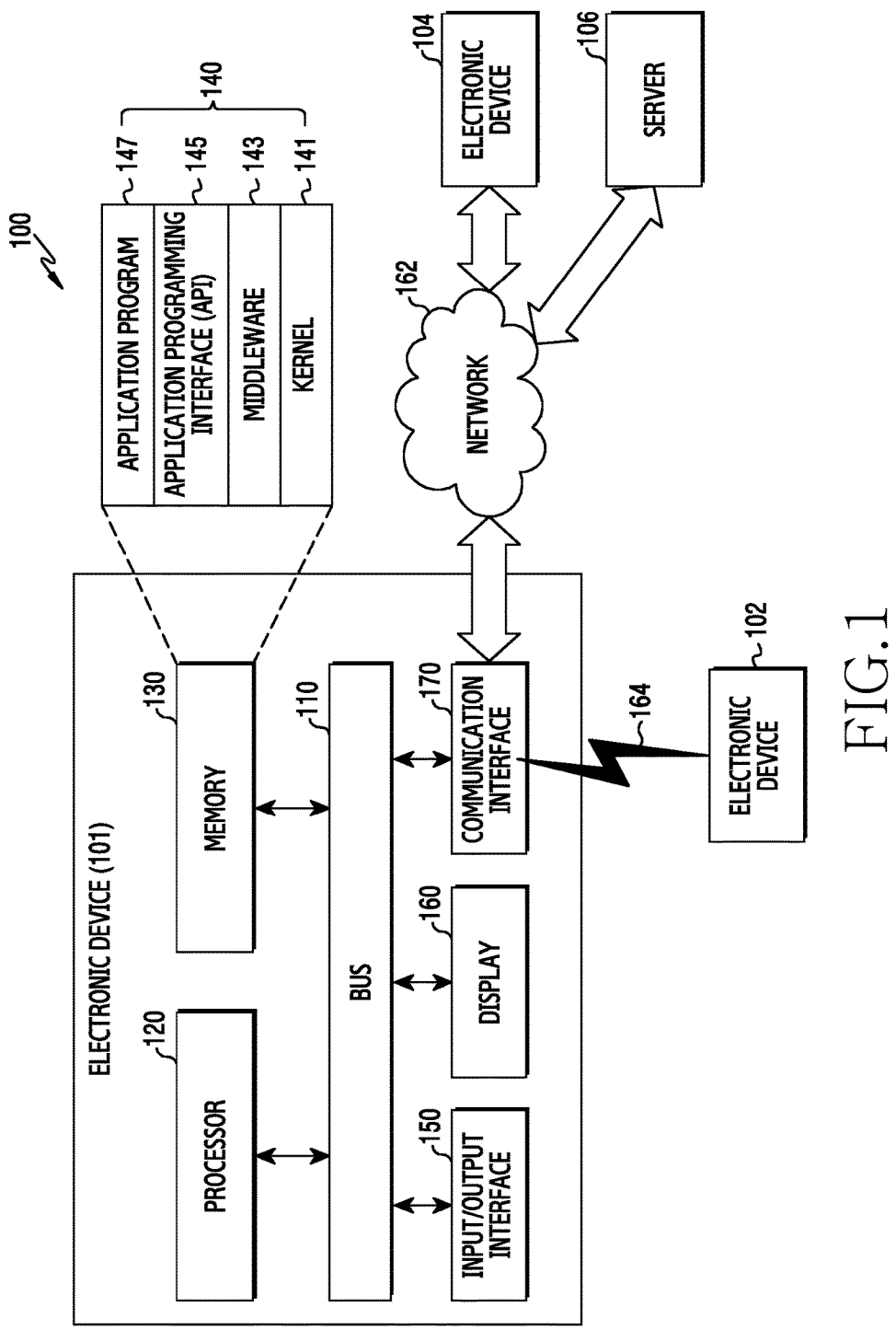
FIG. 1 illustrates a network environment that includes an electronic device, according to an embodiment of the present disclosure.

Hereinafter, various embodiments of the present disclosure will be described in detail with reference to the accompanying drawings. However, it should be understood that there is no limiting the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. As used herein, the expressions "have", "may have", "include", or "may include" refer to the existence of a corresponding feature (e.g., numeral, function, operation, or constituent element such as component), and do not exclude one or more additional features.

The expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B. The expressions "a first", "a second", "the first", or "the second" may modify various components regardless of the order and/or the importance but do not limit the corresponding components. For example, a first user device and a second user device indicate different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled to the other element or any other element (e.g., third element) may be interposed between them. In contrast, when an element (e.g., first element) is referred to as being "directly connected," or "directly coupled" to another element (second element), there are no elements (e.g., third element) interposed between them.

The expression "configured to" as used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Terms such as those defined in a generally used dictionary may be interpreted to have the same meanings as the contextual meanings in the relevant field of art, and are not to be interpreted to have ideal or excessively formal meanings unless clearly defined in the present disclosure. In some cases, even terms defined in the present disclosure should not be interpreted to exclude embodiments of the present disclosure.

An electronic device according to an embodiment of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), an MPEG-1 audio layer-3 (MP3) player, a mobile medical device, a camera, and a wearable device. The wearable device may include at least one of an accessory type (e.g., a watch, a ring, a bracelet, an anklet, a necklace, eyeglasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to an embodiment of the present disclosure, the electronic device may be a home appliance. The home appliance may include at least one of, for example, a television, a digital video disk (DVD) player, an audio player, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to an embodiment of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM), point of sales (POS) terminal, or Internet of things (IoT) device (e.g., a light bulb, various sensors, electric or gas meter, a sprinkler device, a fire alarm, a thermostat, a streetlamp, a toaster, a sporting good, a hot water tank, a heater, a boiler, etc.).

According to an embodiment of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. Further, the electronic device is not limited to the aforementioned devices, and may include a new electronic device according to the development of new technology.

Hereinafter, an electronic device according to an embodiment of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device, according to an embodiment of the present disclosure.

An electronic device 101 within a network environment 100, according to an embodiment of the present disclosure, will be described with reference to FIG. 1. The electronic device 101 includes a bus 110, a processor 120, a memory 130, an input/output interface 150, a display 160, and a communication interface 170. The electronic device 101 may omit at least one of the above components or may further include other components.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 stores software and/or a program 140. The program 140 includes, for example, a kernel 141, middleware 143, an application programming interface (API) 145, and/or application programs (or "applications") 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150, for example, may function as an interface that transfer commands or data input from a user or another external device to other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display, a microelectromechanical systems (MEMS) display, and an electronic paper display. The display 160 may display, for example, various types of content (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device, such as a first external electronic device 102, a second external electronic device 104, or a server 106. For example, the communication interface 170 may be connected to a network 162 through wireless or wired communication, and may communicate with the second external electronic device 104 or the server 106. The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164.

The short-range communication 164 may include at least one of, for example, Wi-Fi, Bluetooth, near field communication (NFC), and global navigation satellite system (GNSS). GNSS may include, for example, at least one of global positioning system (GPS), global navigation satellite system (Glonass), Beidou navigation satellite system (Beidou) or Galileo, and the European global satellite-based navigation system, based on a location, a bandwidth, and the like. Hereinafter, in the present disclosure, the term "GPS" may be interchangeably used with the term "GNSS". The wired communication may include, for example, at least one of a universal serial bus (USB), a high definition multimedia interface (HDMI), recommended standard 232 (RS-232), and a plain old telephone service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to an embodiment of the present disclosure, the server 106 may include a group of one or more servers. All or some of the operations performed in the electronic device 101 may be executed in another electronic device or the electronic devices 102 and 104 or the server 106. When the electronic device 101 has to perform some functions or services automatically or in response to a request, the electronic device 101 may request the electronic device 102 or 104 or the server 106 to execute at least some functions relating thereto instead of or in addition to autonomously performing the functions or services. The electronic device 102 or 104, or the server 106 may execute the requested functions or the additional functions, and may deliver a result of the execution to the electronic device 101. The electronic device 101 may process the received result as is or additionally, and may provide the requested functions or services. To this end, for example, cloud computing, distributed computing, or client-server computing technologies may be used.

Figure 2:
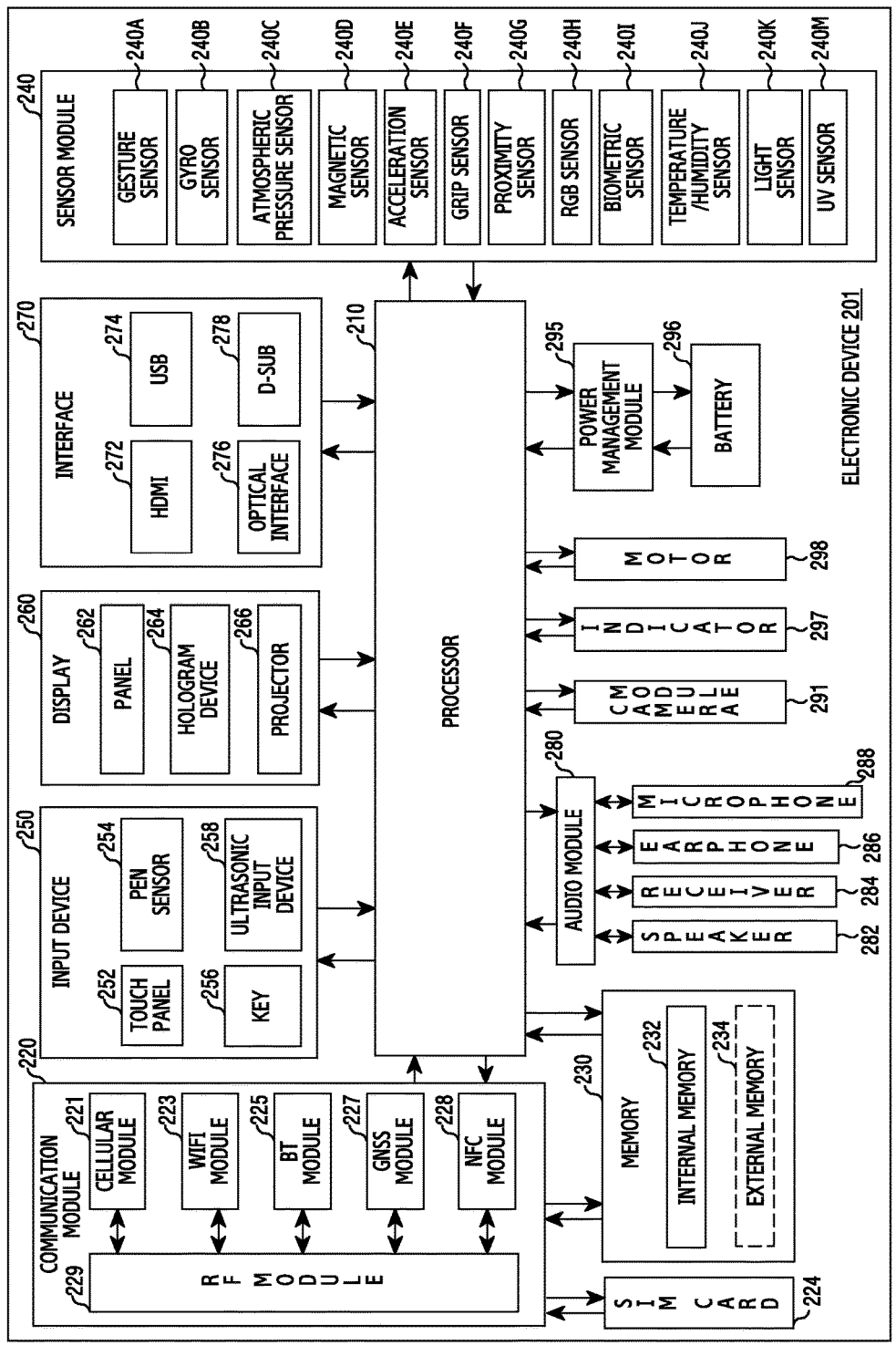
FIG. 2 is a block diagram of an electronic device, according to an embodiment of the present disclosure.

FIG. 2 is a block diagram of an electronic device, according to an embodiment of the present disclosure.

The electronic device 201 may include, for example, all or a part of the electronic device 101 shown in FIG. 1. The electronic device 201 includes one or more processors 210 (e.g., application processors (AP)), a communication module 220, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). According to an embodiment of the present disclosure, the processor 210 may further include a graphic processing unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 includes, for example, the cellular module 221, a Wi-Fi module 223, a BT module 225, a GNSS module 227 (e.g., a GPS module 227, a Glonass module, a Beidou module, or a Galileo module), an NFC module 228, and a radio frequency (RF) module 229.

The cellular module 221, for example, may provide a voice call, a video call, a text message service, or an Internet service through a communication network. According to an embodiment of the present disclosure, the cellular module 221 may distinguish and authenticate the electronic device 201 in a communication network using a subscriber identification module (SIM card) 224. The cellular module 221 may perform at least some of the functions that the AP 210 may provide. The cellular module 221 may include a communication processor (CP).

For example, each of the Wi-Fi module 223, the BT module 225, the GNSS module 227, and the NFC module 228 may include a processor for processing data transmitted/received through a corresponding module. According to an embodiment of the present disclosure, at least some (e.g., two or more) of the cellular module 221, the Wi-Fi module 223, the BT module 225, the GNSS module 227, and the NFC module 228 may be included in one integrated chip (IC) or IC package.

The RF module 229, for example, may transmit/receive a communication signal (e.g., an RF signal). The RF module 229 may include, for example, a transceiver, a power amplifier module (PAM), a frequency filter, a low noise amplifier (LNA), and an antenna. According to an embodiment of the present disclosure, at least one of the cellular module 221, the WIFI module 223, the BT module 225, the GNSS module 227, and the NFC module 228 may transmit/receive an RF signal through a separate RF module.

The SIM card 224 may include, for example, an embedded SIM, and may contain unique identification information (e.g., an integrated circuit card identifier (ICCID)) or subscriber information (e.g., an international mobile subscriber identity (IMSI)).

The memory 230 (e.g., the memory 130) includes, for example, an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, for example, a compact flash (CF), a secure digital (SD), a micro secure digital (Micro-SD), a mini secure digital (Mini-SD), an extreme digital (xD), a multimediacard (MMC), a memory stick, and the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 includes, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 includes, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone 288, ultrasonic waves generated by an input tool, and identify data corresponding to the detected ultrasonic waves.

The display 260 (e.g., the display 160) includes a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior or on the exterior of the electronic device 201. According to an embodiment of the present disclosure, the display 260 may further include a control circuit for controlling the panel 262, the hologram device 264, or the projector 266.

The interface 270 includes, for example, a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a secure digital (SD) card/multi-media card (MMC) interface, or an infrared data association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288.

The camera module 291 is, for example, a device which may photograph a still image and a video. According to an embodiment of the present disclosure, the camera module 291 may include one or more image sensors (e.g., a front sensor or a back sensor), a lens, an image signal processor (ISP) or a flash (e.g., LED or xenon lamp).

The power management module 295 may manage, for example, power of the electronic device 201. According to an embodiment of the present disclosure, the power management module 295 may include a power management integrated circuit (PMIC), a charger integrated circuit (IC), or a battery gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual charge quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, and the like) of the electronic device 201 or a part (e.g., the processor 210) of the electronic device 201. The motor 298 may convert an electrical signal into a mechanical vibration, and may generate a vibration, a haptic effect, and the like. The electronic device 201 may include a processing device (e.g., a GPU) for supporting a mobile TV. The processing device for supporting a mobile TV may process, for example, media data according to a certain standard such as digital multimedia broadcasting (DMB), digital video broadcasting (DVB), or MediaFLO™.

Each of the above-described component elements of hardware may be configured with one or more components, and the names of the corresponding component elements may vary based on the type of electronic device. The electronic device may include at least one of the above-described elements. Some of the above-described elements may be omitted from the electronic device, or the electronic device may further include additional elements. Also, some of the hardware components according to an embodiment of the present disclosure may be combined into one entity, which may perform functions identical to those of the relevant components before the combination.

Figure 3:
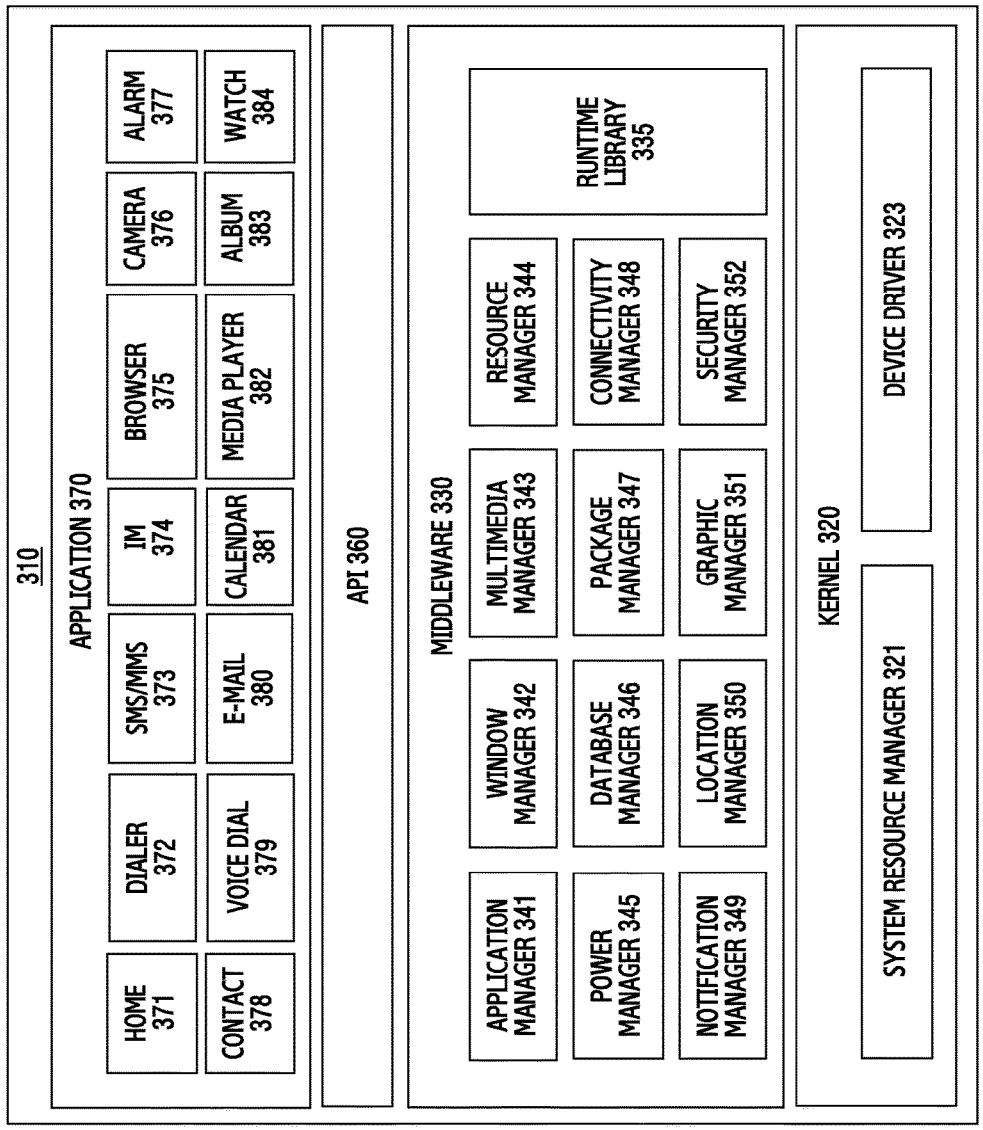
FIG. 3 is a block diagram of a program module according to an embodiment of the present disclosure.

FIG. 3 is a block diagram of a program module, according to an embodiment of the present disclosure.

According to an embodiment of the present disclosure, the program module 310 (e.g., the program 140) may include an operating system (OS) for controlling resources related to the electronic device 101 and/or various applications (e.g., the application programs 147) executed in the operating system. The operating system may be, for example, Android™, iOS™, Windows™, Symbian™, Tizen™, Bada™, and the like.

The program module 310 includes a kernel 320, middleware 330, an API 360, and/or applications 370. At least some of the program module 310 may be preloaded on an electronic device, or may be downloaded from the electronic device 102 or 104, or the server 106.

The kernel 320 (e.g., the kernel 141) includes, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

For example, the middleware 330 may provide a function required in common by the applications 370, or may provide various functions to the applications 370 through the API 360 so as to enable the applications 370 to efficiently use the limited system resources in the electronic device. According to an embodiment of the present disclosure, the middleware 330 (e.g., the middleware 143) includes at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, and the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a basic input/output system (BIOS), and the like to manage a battery or power source and may provide power information, and the like required for the operation of the electronic device. The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, and the like. According to an embodiment of the present disclosure, when the electronic device 101 has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove some of the existing components or add new components.

The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 (e.g., the application programs 147) include, for example, one or more applications which may provide functions such as a home 371, a dialer 372, an SMS/MMS 373, an instant message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar level), or environment information (e.g., providing atmospheric pressure, humidity, or temperature information).

According to an embodiment of the present disclosure, the applications 370 may include an information exchange application that supports exchanging information between the electronic device 101 and the electronic device 102 or 104. The information exchange application may include, for example, a notification relay application for transferring specific information to an external electronic device or a device management application for managing an external electronic device.

For example, the notification relay application may include a function of transferring, to the external electronic device 102 or 104, notification information generated from other applications of the electronic device 101 (e.g., an SMS/MMS application, an e-mail application, a health management application, or an environmental information application). Further, the notification relay application may receive notification information from, for example, an external electronic device and provide the received notification information to a user.

The device management application may manage (e.g., install, delete, or update), for example, at least one function of an external electronic device 102 or 104 communicating with the electronic device (e.g., a function of turning on/off the external electronic device itself (or some components) or a function of adjusting the brightness (or a resolution) of the display), applications operating in the external electronic device, and services provided by the external electronic device (e.g., a call service or a message service).

According to an embodiment of the present disclosure, the applications 370 may include applications (e.g., a health care application of a mobile medical appliance or the like) designated according to an external electronic device 102 or 104. The applications 370 may include an application received from the server 106, or the electronic device 102 or 104. The applications 370 may include a preloaded application or a third party application that may be downloaded from a server. The names of the components of the program module 310 may change according to the type of operating system.

According to an embodiment of the present disclosure, at least a part of the programming module 310 may be implemented in software, firmware, hardware, or a combination of two or more thereof. At least some of the program module 310 may be implemented (e.g., executed) by, for example, the processor 210. At least some of the program module 310 may include, for example, a module, a program, a routine, a set of instructions, and/or a process for performing one or more functions.

The term "module" as used herein may, for example, mean a unit including one of hardware, software, and firmware or a combination of two or more of them. The term "module" may be interchangeably used with, for example, the terms "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to an embodiment of the present disclosure may include at least one of an application-specific integrated circuit (ASIC) chip, a field-programmable gate array (FPGA), and a programmable-logic device for performing operations which have been known or are to be developed hereinafter. At least some of the devices (for example, modules or functions thereof) or the method (for example, operations) may be implemented by a command stored in a computer-readable storage medium in a programming module form. The instruction, when executed by the processor 120, may cause the one or more processors to execute the function corresponding to the instruction. The computer-readable recording media may be, for example, the memory 130.

Figure 4:
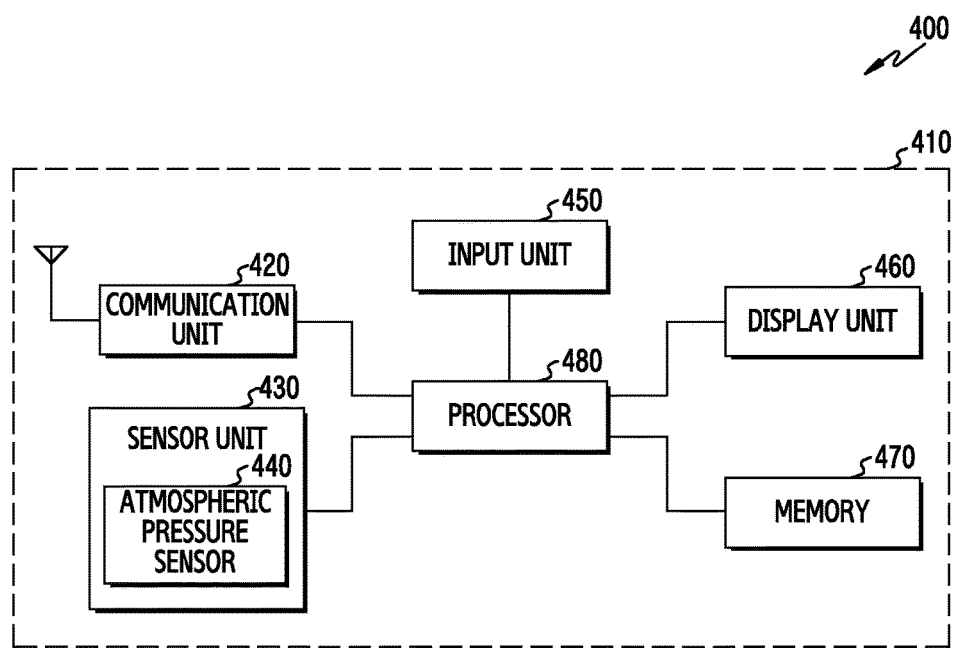
FIG. 4 is a block diagram of main elements of an electronic device that includes an atmospheric pressure sensor, according to an embodiment of the present disclosure.

FIG. 4 is a block diagram of main elements of an electronic device that includes an atmospheric pressure sensor, according to an embodiment of the present disclosure.

Referring to FIG. 4, the electronic device 400, according to an embodiment of the present disclosure, includes a housing 410, a communication unit 420, a sensor unit 430, an input unit 450, a display unit 460, a memory 470, and a processor 480. The electronic device 400 may be a wearable device, for example, a smart watch, or may be a smart phone.

The communication unit 420, according to an embodiment of the present disclosure, may perform communication in the electronic device 400. The communication unit 420 may communicate with an external device through various communication schemes. The communication unit 420 may perform at least one of wireless communication and wired communication. The communication unit 420 may access at least one of a mobile communication network and a data communication network. For example, the external device may include an electronic device, a base station, a server, and a satellite. The communication schemes may include long term evolution (LTE), wideband code division multiple access (WCDMA), global system for mobile communications (GSM), WiFi, Bluetooth, and near field communications (NFC).

The sensor unit 430, according to an embodiment of the present disclosure, may, for example, measure a physical quantity or detect the operating state of the electronic device 400 and may convert the measured or detected information into an electrical signal. The sensor unit 430 may include, for example, an atmospheric pressure sensor 440. The sensor unit 430 may include a control circuit for controlling at least one sensor. The sensor unit 430 may provide, to the processor 480, information sensed by at least one sensor. The atmospheric pressure sensor 440 within the space of the housing 410 may detect an atmospheric pressure variation and may provide the same to the processor 480. The atmospheric pressure sensor 440 may be located in at least one area within the space of the housing 410. The atmospheric pressure sensor 440 may be located in at least one sealed area within the space of the housing 410.

The input unit 450, according to an embodiment of the present disclosure, may generate input data to the electronic device 400, in response to a user input to the electronic device 400. The input unit 450 may include at least one input means, such as a key pad, a dome switch, a physical button, a touch panel, and a jog & shuttle button. The touch panel may sense coordinate information relating to a motion thereon (for example, a touch by a user's finger) and may transfer the coordinate information to the processor 480.

The display unit 460, according to an embodiment of the present disclosure, may include a liquid crystal display (LCD), a light emitting diode (LED) display, an organic LED (OLED) display, a micro electro mechanical system (MEMS) display, and an electronic paper display. The display unit 460 may include a plurality of light emitting elements. The display unit 460, together with the input unit 450 constituted by a touch panel, may be implemented as a touch screen. The display unit 460 implemented as the touch screen may transfer, to the processor 480, coordinate information relating to a motion detected on the surface of the display unit 460 (for example, coordinate information relating to hovering or touch by a user's hand or finger).

The memory 470, according to an embodiment of the present disclosure, may store operating programs of the electronic device 400. To this end, the memory 470 may include, for example, an internal or external memory. The internal memory may include, for example, at least one of a volatile memory (for example, a dynamic RAM (DRAM), a static RAM (SRAM), a synchronous dynamic RAM (SDRAM), etc.) and a non-volatile memory (for example, a one-time programmable read only memory (OTPROM), a programmable ROM (PROM), an erasable and programmable ROM (EPROM), an electrically erasable and programmable ROM (EEPROM), a mask ROM, a flash ROM, a flash memory (for example, a NAND flash memory, a NOR flash memory, etc.), a hard disc drive, or a solid state drive (SSD)). The external memory may include a flash drive, which may be, for example, a compact flash (CF), a secure digital (SD), a micro secure digital (Micro-SD), a mini secure digital (Mini-SD), an extreme digital (xD), a multi-media card (MMC), a memory stick, etc. The external memory may be functionally and/or physically connected with the electronic device through various interfaces.

The processor 480, according to an embodiment of the present disclosure, may receive a touch input that corresponds to a pressure generated on a part of the display unit 460, and monitors an atmospheric pressure variation using the atmospheric pressure sensor 440 while the touch input is being received. The processor 480 may provide and/or display, on the display unit 460, a function selected based on the monitored atmospheric pressure variation and at least a part of the touch input.

When a touch input on the display unit 460 is detected, the processor 480, according to an embodiment of the present disclosure, may identify a touch location where the touch input is detected. The processor 480 may identify an atmospheric pressure value sensed by the atmospheric pressure sensor 440 when the touch input is generated. The processor 480 may calculate an atmospheric pressure variation using a reference atmospheric pressure value set for the location where the touch input is generated and the atmospheric pressure value identified when the touch input is generated. The processor 480 may divide the touch panel included in the display unit 460 into a plurality of virtual areas, and may identify the reference atmospheric pressure value detected by the atmospheric pressure sensor 440 while there is no touch input to the display unit 460. The processor 480 may perform a function that corresponds to the touch location and the atmospheric pressure variation when the calculated atmospheric pressure variation exceeds a threshold value. The processor 480 may perform a function that corresponds to the identified touch location when the calculated atmospheric pressure variation is less than or equal to the threshold value.

When a drag input on the display unit 460 is detected while a function of drawing a line is being performed, the processor 480, according to an embodiment of the present disclosure, may identify the start point of the drag input. The processor 480 may identify an atmospheric pressure value sensed by the atmospheric pressure sensor 440 when the drag input is generated. The processor 480 may calculate an atmospheric pressure variation using a reference atmospheric pressure value set for the location where the drag input is generated and the atmospheric pressure value identified when the drag input is generated. The processor 480 may divide the touch panel included in the display unit 460 into a plurality of virtual areas, and may identify the reference atmospheric pressure value detected by the atmospheric pressure sensor 440 while there is no touch input to the display unit 460. The processor 480 may compare the calculated atmospheric pressure variation and a threshold value to set the thickness of a line to be displayed on the display unit 460. The processor 480 may display, on the display unit 460, a line according to the drag input using the set line thickness.

The processor 480, according to an embodiment of the present disclosure, may identify, in real time or periodically, the atmospheric pressure value sensed by the atmospheric pressure sensor 440 until a drag input ends. The processor 480 may compare a current atmospheric pressure value and a previous atmospheric pressure value, set a line thickness according to the comparison result, and display, on the display unit 460, a line with the set line thickness according to the drag input. When the two atmospheric pressure values are equal to each other, the processor 480 may display, on the display unit 460, a line according to the drag input while maintaining the set line thickness. When the previously identified atmospheric pressure value is greater than the currently identified atmospheric pressure value, the processor 480 may make the line thickness thinner and may display, on the display unit 460, a line according the drag input. When the previously identified atmospheric pressure value is less than the currently identified atmospheric pressure value, the processor 480 may make the line thickness thicker and may display, on the display unit 460, a line according the drag input.

FIGS. 5A-5C illustrate an arrangement of elements of an electronic device, according to an embodiment of the present disclosure.

Referring to FIGS. 5A-5C, the housing 410 of the electronic device 400 may be formed of a first plate 410a and a second plate 410b. The first plate 410a may extend in a first direction, and the second plate 410b may extend in a second direction. The first plate 410a and the second plate 410b may include a side member that surrounds the space between the two plates. The side member may be separated from, or partially coupled with, the first plate 410a or the second plate 410b. The first plate 410a and the second plate 410b may be coupled to each other through the side member to form the housing 410. At least a part of the space within the housing 410 may be formed such that the space is not in fluid communication with the outside of the housing 410.

The display unit 460, according to an embodiment of the present disclosure, may be exposed through at least a part of the first plate 410a, and may be located within the housing 410. The display unit 460 may include a touch panel 460a, a touch screen panel (TSP) flexible printed circuit board (FPCB) 460b, and a TSP IC 460c. The touch panel 460a, which is a transparent touch panel, may be connected with the TSP FPCB 460b, and the TSP IC 460c may be mounted on the TSP FPCB 460b.

The second plate 410b, according to an embodiment of the present disclosure, may be provided with a barometric or the atmospheric pressure sensor 440 that may detect an atmospheric pressure variation within the space of the housing 410 that is formed by coupling the first plate 410a and the second plate 410b. The term "barometric sensor" may be used interchangeably with the term "atmospheric pressure sensor". The barometric sensor 440 may be located in at least one area within the space of the housing 410. At least one area within the space of the housing 410 may be sealed, and the barometric sensor 440 may be located within the sealed space.

The second plate 410b, according to an embodiment of the present disclosure, may be provided with a main printed circuit board (PCB) 480b on which the barometric sensor 440 and an micro controller unit (MCU) 480a are mounted. The processor 480 may include the MCU 480a and the main PCB 480b. The TSP FPCB 460b and the main PCB 480b may be connected through male and female connectors 411 and 412. The second plate 410b may be provided with a battery 491, a sub-PCB 492, and a USB port 420a. The battery 491 may be recharged with a power supply from the outside through the USB port 420a that may be connected with an external power supply, and may be discharged according to the use of the electronic device 400. The sub-PCB 492 may refer to a PCB, other than the main PCB 480b, on which the MCU 480a is mounted. The sub-PCB 492 may not be part of the electronic device 400, according to the type of electronic device 400.

Figure 6:
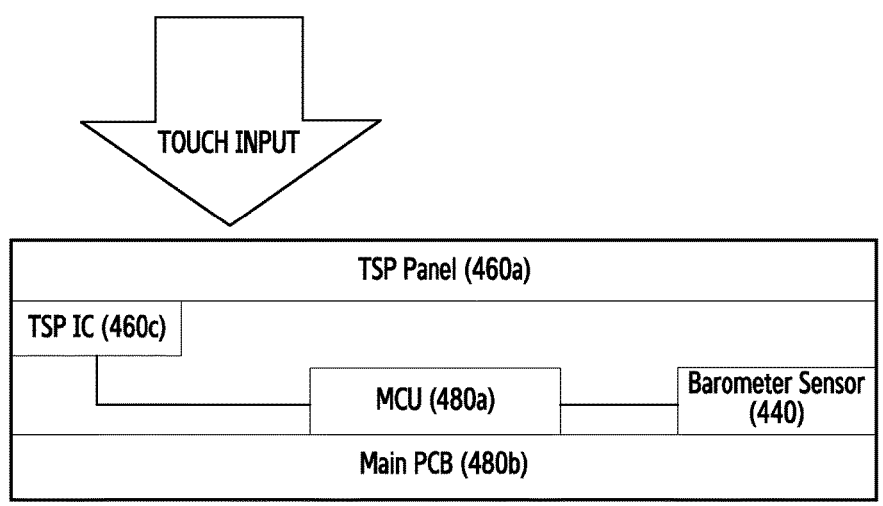
FIG. 6 is a cross sectional view illustrating an arrangement of elements of an electronic device, according to an embodiment of the present disclosure.

FIG. 6 is a cross sectional view illustrating an arrangement of elements of an electronic device, according to an embodiment of the present disclosure.

Referring to FIG. 6, when a touch input is generated on the TSP panel 460a, the TSP IC 460c may identify the location where the touch input is generated. The TSP IC 460c may transfer, to the MCU 480a, information indicating the touch input has been generated on the TSP panel 460a and may transfer the location where the touch input has been generated. The MCU 480a may be mounted on the main PCB 480b. The barometric sensor 440 may sense an atmospheric pressure value caused by the touch input that has been generated on the TSP panel 460a. The barometric sensor 440 may transfer the sensed atmospheric pressure value to the MCU 480a. The barometric sensor 440 may sense a reference atmospheric pressure value while there is no touch input on the TSP panel 460a.

The MCU 480a, according to an embodiment of the present disclosure, may compare the transferred atmospheric pressure value and the reference atmospheric pressure value. When the comparison result shows that an atmospheric pressure variation is greater than or equal to a threshold value, the MCU 480a may perform a corresponding function based on the touch location where the touch input has been generated and the atmospheric pressure variation. When the comparison result shows that an atmospheric pressure variation is less than the threshold value, the MCU 480a may perform a function corresponding to the touch location where the touch input has been generated.

An electronic device 400, according to an embodiment of the present disclosure, include a housing 410 that includes a first plate 410a extending in a first direction, a second plate 410b extending in a second direction opposite to the first direction, and a side member configured to surround the space between the first plate 410a and the second plate 410b, wherein the side member is partially integrated with the first plate 410a or second plate 410b, or is separated from the first plate 410a or second plate 410b, a touch screen display (for example, a display unit 460) that includes a touch panel, the touch screen display being located within the housing 410 and exposed through at least a part of the first plate 410a, an atmospheric pressure sensor 440 provided within the space of the housing 410 and configured to detect an atmospheric pressure variation, a processor 480 electrically connected with the display unit 460 and the sensor 440, and a memory 470 electrically connected to the processor 480, the memory 470 may store instructions which when executed by the processor 480, cause the processor to receive a touch input caused by pressing a part of the display unit 460, monitor the atmospheric pressure variation using the sensor 440 while receiving the touch input, and provide a changed and/or selected function of the display unit 460 based at least in part on the monitored atmospheric pressure variation and the touch input.

The sensor 440 may be located in at least one area of the space in the housing 410, and the at least one area of the space in the housing 410 may be at least partially sealed.

The at least one area of the space in the housing 410 is not in fluid communication with the outside of the housing 410.

The instructions, when executed by the processor 480, cause the processor 480 to compare the atmospheric pressure variation with a selected threshold value and to perform the selected function based at least in part on the comparison result.

The instructions, when executed by the processor 480, cause the processor 480 to perform the selected function based on the variation and the location of the touch input when the variation is greater than the threshold value.

The instructions, when executed by the processor 480, cause the processor 480 to perform the selected function based on the location of the touch input irrespective of the variation when the variation is less than the threshold value.

The touch panel may include a plurality of sub-areas, and two of the plurality of sub-areas may have different threshold values for the atmospheric pressure variation.

The instructions, when executed by the processor, cause the processor 480 to determine the location on the touch panel based on the touch input, determine a first sub-area containing the determined location among the plurality of sub-areas, and compare a threshold value associated with the first sub-area and the atmospheric pressure variation.

The electronic device 400 may further include a printed circuit board provided within the housing 410 and located between the display unit 460 and the second plate 410b, the printed circuit board may include a surface extending toward the display unit 460, and the sensor 440 may be disposed on the surface extending toward the display unit 460.

An electronic device 400, according to an embodiment of the present disclosure, includes a housing 410 that includes a first plate 410a extending in a first direction, a second plate 410b extending in a second direction opposite to the first direction, and a side member configured to surround the space between the first plate 410a and the second plate 410b, wherein the side member is partially integrated with the first plate 410a or second plate 410b, or is separated from the first plate 410a or second plate 410b, a connecting member connected to the housing 410 and detachably mounted on a part of a user's body, a touch screen display (for example, display unit 460) that includes a touch panel, the touch screen display being located within the housing 410 and exposed through at least a part of the first plate 410a, an atmospheric pressure sensor 440 provided within the space of the housing 410 and configured to detect an atmospheric pressure variation, a processor 480 electrically connected with the display unit 460 and the atmospheric pressure sensor 440, and a memory 470 electrically connected with the processor 480, the memory 470 may store instructions, which when executed by the processor 480, cause the processor to receive a touch input caused by pressing a part of the display unit 460, and monitor the atmospheric pressure variation using the atmospheric pressure sensor 440 while receiving the touch input.

The instructions, when executed by the processor 480, cause the processor 480 to provide a changed and/or selected function of the display unit 460 based at least in part on the monitored atmospheric pressure variation and the touch input.

FIGS. 7A-7D illustrate a screen obtained by virtually dividing a touch panel included in a touch screen of an electronic device, according to an embodiment of the present disclosure.

FIG. 8 illustrates threshold values allocated to areas of the virtually divided touch panel, according to an embodiment of the present disclosure.

Figure 7A:
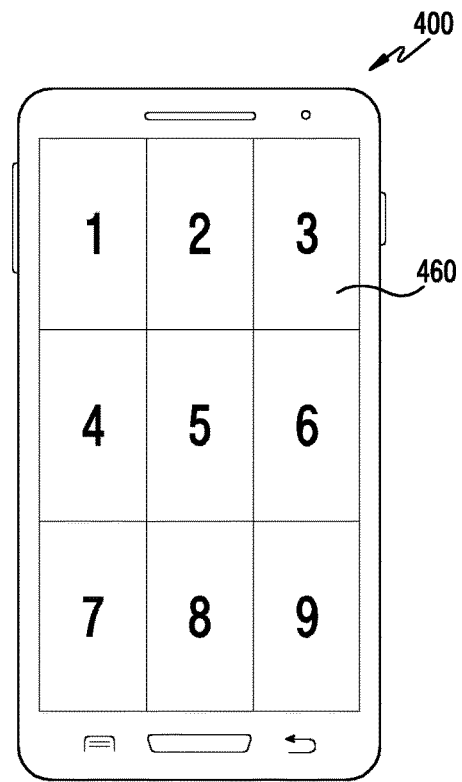
FIGS. 7A-7D illustrate a screen obtained by virtually dividing a touch panel included in a touch screen of an electronic device, according to an embodiment of the present disclosure.
Figure 7B:
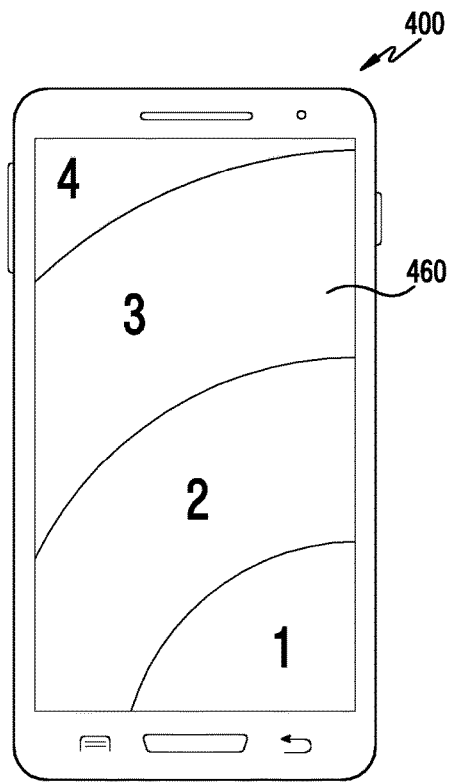
Figure 7C:
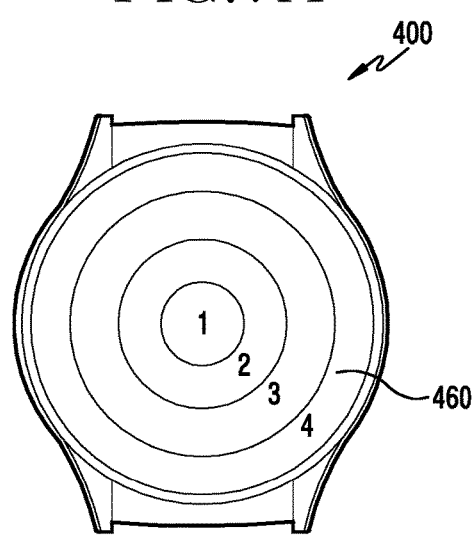
Figure 7D:
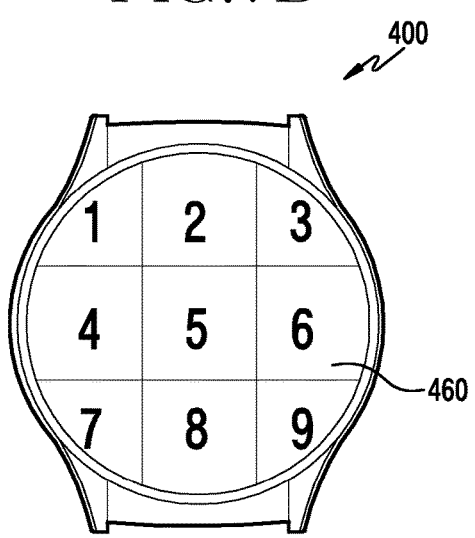

Referring to FIGS. 7A-7D and FIG. 8, in a case where the electronic device 400 is a smart phone, the display unit 460 may be divided into nine virtual areas in a 3 by 3 array as shown in FIG. 7A. In a case where the electronic device 400 is a smart phone, the display unit 460 may be divided into a plurality of virtual areas having a circular arc shape with respect to a specific vertex of the display unit 460 as shown in FIG. 7B. In a case where the electronic device 400 is a smart watch, the display unit 460 may be divided into a plurality of virtual areas having circular shapes with different sizes as shown in FIG. 7C. In a case where the electronic device 400 is a smart watch, the display unit 460 may be divided into a plurality of virtual areas as shown in FIG. 7D.

The electronic device 400, according to an embodiment of the present disclosure, may allocate reference values and first measurement values as illustrated in FIG. 8 to the areas divided from each other as shown in FIG. 7A. Each reference value may refer to a reference atmospheric pressure value and a reference altitude value that are detected by the barometric sensor 440 while there is no touch input on the display unit 460. For example, a reference atmospheric pressure value of 987.45 hectopascal (hPa) and a reference altitude value of 217.06 meters may be allocated to the area corresponding to row 1, column 1 to which number 1 is assigned. In this way, the reference atmospheric pressure values and the reference altitude values may be allocated to the areas to which numbers 2 to 9 are allocated, respectively. In this case, the altitude values may be obtained by converting atmospheric pressure values detected by the barometric sensor 440.

The electronic device 400, according to an embodiment of the present disclosure, may allocate the first measurement values to the respective areas divided from each other when a touch input with a predetermined strength is generated on the display unit 460. Each of the first measurement values may refer to an atmospheric pressure value and an altitude value that are detected by the barometric sensor 440 while the touch input with the predetermined strength has been generated on the display unit 460. For example, when a touch input with a predetermined strength is generated in the area of the display unit 460 that corresponds to row 1, column 1 to which number 1 is allocated, an atmospheric pressure value of 991.77 hPa and an altitude value of 185 meters may be detected in the area. The electronic device 400 may set the atmospheric pressure value and the altitude value to the first measurement value. As described above, the electronic device 400 may provide a touch input with a predetermined strength to each area and may set the atmospheric pressure value and the altitude value detected in the area to the first measurement value for the area. The electronic device 400 may calculate a variation using the reference altitude value of the reference value and the measured altitude value of the first measurement value.

When a touch input with a predetermined strength is generated on the display unit 460, according to an embodiment of the present disclosure, variations detected in the whole display unit 460 may not be constant according to the position of the barometric sensor 440. Accordingly, the electronic device 400 may virtually divide the display unit 460 and may set different threshold values for the areas divided from each other. The electronic device 400 may compensate for variations in atmospheric pressure values according to touch locations using the different set threshold values. While it is described in the present disclosure that variations, based on which the threshold values are set, are calculated using the altitude values, the variations may also be calculated using the reference atmospheric pressure values and the measured atmospheric pressure values. The electronic device 400 may calculate variations for the respective areas of the display unit 460 that are divided from each other. This may be explained using Table 1 below.

When a touch input with a predetermined strength is generated on the display unit 460, according to an embodiment of the present disclosure, if a variation in an altitude value ranges from −5.00 to −9.99, the electronic device 400 may set a threshold value to −3. Since a variation in the altitude value in the area of the display unit 460 to which number 1 is allocated is −32.06, the electronic device 400 may set a threshold value to −28.

TABLE 1

| Variation in Altitude Value | Set Threshold Value |
| --- | --- |
| −5.00~−9.99 | −3 |
| −10.00~−14.99 | −8 |
| −15.00~−19.99 | −13 |
| −20.00~−24.99 | −18 |
| −25.00~−29.99 | −23 |
| −30.00~−34.99 | −28 |
| −35.00~−39.99 | −33 |

While it is described in the present disclosure that the variations are calculated using the first measurement values, a plurality of variations may be calculated using a plurality of measurement values. The electronic device 400 may calculate a plurality of variations and may set a plurality of threshold values mapped to the variations. The electronic device 400 may perform various functions corresponding to touch inputs according to the plurality of set threshold values. The electronic device 400 may virtually divide the display unit 460 into smaller areas than those of the 3 by 3 array to set accurate operations to be performed.

Figure 9:
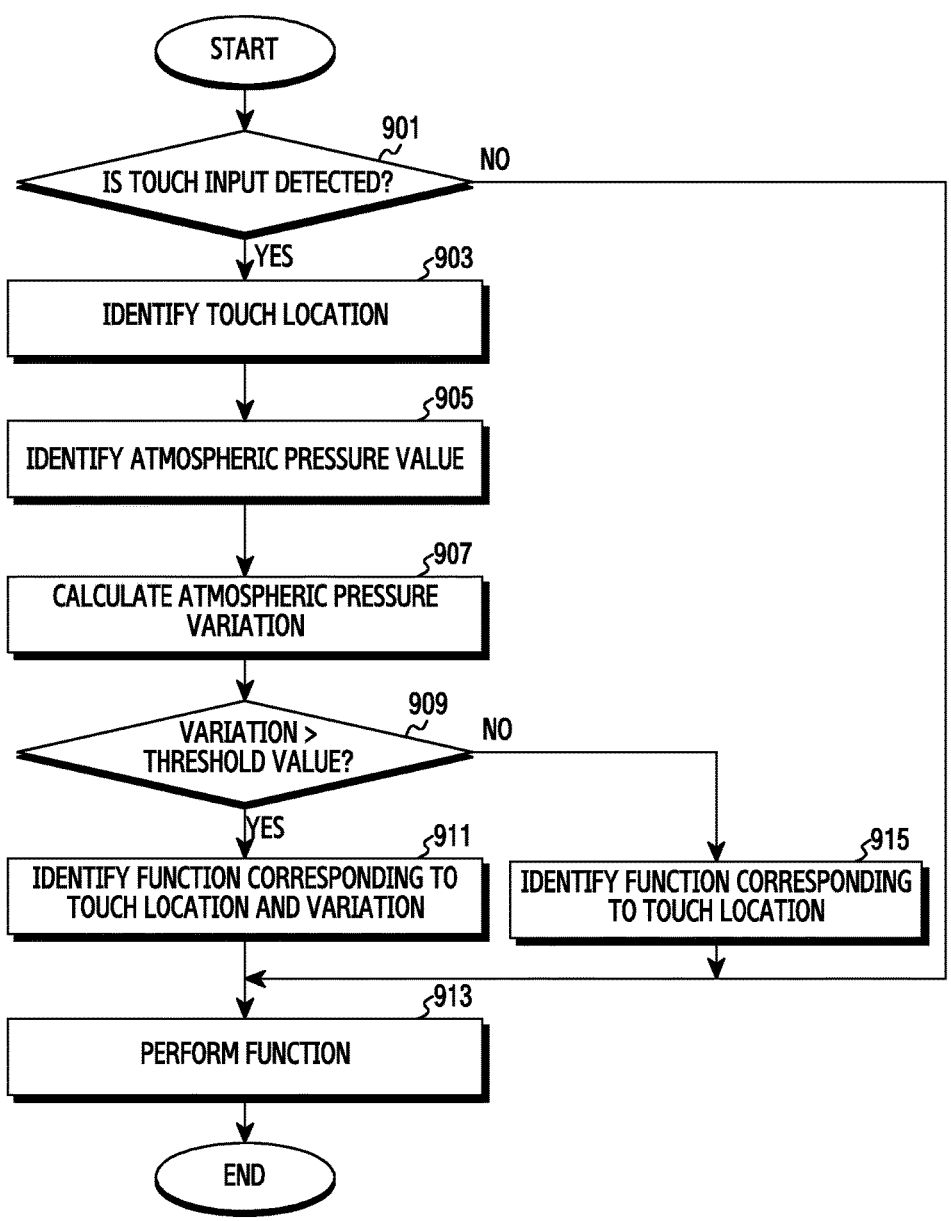
FIG. 9 is a flowchart of an operation of performing a function according to a touch input in an electronic device, according to an embodiment of the present disclosure.

FIG. 9 is a flowchart of an operation of performing a function according to a touch input in an electronic device, according to an embodiment of the present disclosure.

Referring to FIG. 9, the electronic device 400 performs step 903 when a touch input on the display unit 460 is detected in step 901. In step 903, the electronic device 400 identifies the touch location where the touch input is detected on the display unit 460. For example, the electronic device 400 may identify the touch location where the touch input is detected and the area containing the touch location among a plurality of areas of the display unit 460 virtually divided as illustrated in FIGS. 7A-7D. In step 905, the electronic device 400 identifies an atmospheric pressure value corresponding to the pressure that is applied to the display unit 460 when the touch input is generated.

According to an embodiment of the present disclosure, the electronic device 400 calculates an atmospheric pressure variation in step 907. The electronic device 400 may calculate the atmospheric pressure variation using a reference atmospheric pressure value that is allocated, as shown in FIG. 8, to the area containing the touch location and the atmospheric pressure value that is identified in step 905.

When the calculated atmospheric pressure variation exceeds a threshold value set by Table 1 in step 909, the electronic device 400 performs step 911. In step 911, the electronic device 400 identifies a function that corresponds to the touch location identified in step 903 and the atmospheric pressure variation. In step 913, the electronic device 400 performs the function identified in step 911. While it is described in this embodiment that the calculated atmospheric pressure variation is compared with one threshold value, the present disclosure is not limited thereto. For example, when a plurality of threshold values, such as a first threshold value, a second threshold value, etc., are set, the electronic device 400 may compare the calculated atmospheric pressure variation with the plurality of threshold values. According to the comparison result, the electronic device 400 may perform a function that corresponds to the first threshold value and the touch location, or may perform a function that corresponds to the second threshold value and the touch location. When a plurality of touch inputs are generated in the same touch location, the electronic device 400 may perform different functions according to the atmospheric pressure values of the respective touch inputs.

According to an embodiment of the present disclosure, the electronic device 400 performs step 915 when the calculated atmospheric pressure variation is less than or equal to the threshold value in step 909. In step 915, the electronic device 400 identifies a function that corresponds to the touch location identified in step 903. In step 913, the electronic device 400 performs the function identified in step 915.

Figures 10A, 10B:
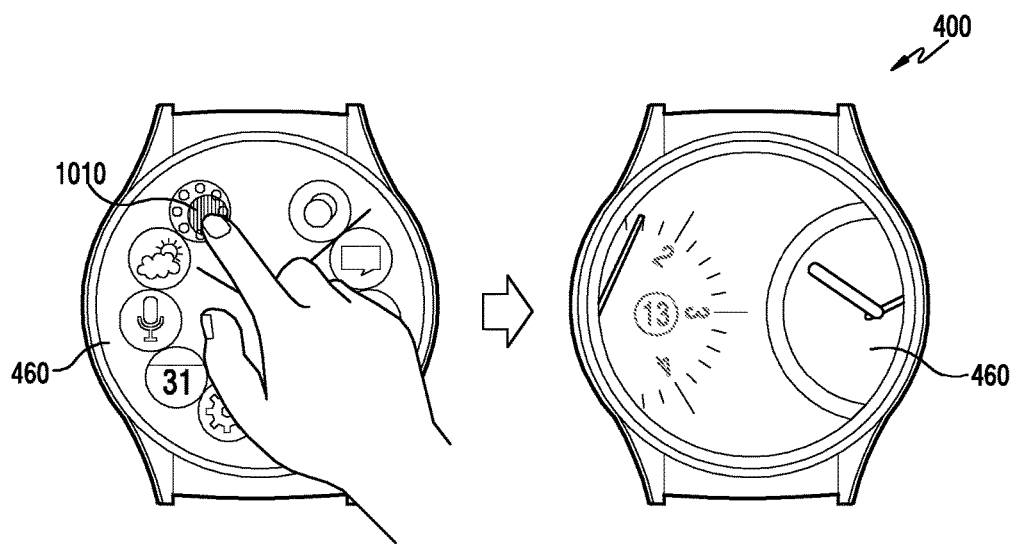
FIGS. 10A-10C illustrate a screen that is changed according to a touch input in a wearable device, according to an embodiment of the present disclosure.
Figure 10C:
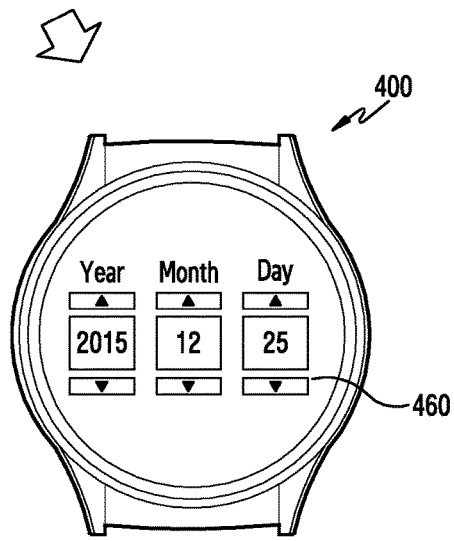

FIGS. 10A-10C illustrate a screen that is changed according to a touch input in a wearable device, according to an embodiment of the present disclosure.

Referring to FIGS. 10A-10C, the electronic device 400 may be a wearable device, for example, a smart watch. As shown in FIG. 10A, a touch input may be generated in a specific area 1010 of the display unit 460 on which a standby screen is displayed. When the touch input is detected, the electronic device 400 may identify the touch location where the touch input is generated, and may identify the area containing the touch location among a plurality of areas of the display unit 460 virtually divided as shown in FIGS. 7A-7D. From information sensed by the barometric sensor 440 included in the sensor unit 430, the electronic device 400 may identify an atmospheric pressure value caused by the pressure that is applied to the display unit 460 when the touch input is generated.

According to an embodiment of the present disclosure, the electronic device 400 may calculate an atmospheric pressure variation in the area containing the touch location using a reference atmospheric pressure value allocated to the area containing the touch location and the identified atmospheric pressure value. The electronic device 400 may compare the calculated atmospheric pressure variation with a threshold value set for the area containing the touch location. For example, a plurality of threshold values may be set in the electronic device 400. When the atmospheric pressure variation is between a first threshold value and a second threshold value, the electronic device 400 may perform a function that corresponds to the icon displayed in the specific area 1010 and corresponds to the atmospheric pressure variation. The electronic device 400 may display a watch screen on the display unit 460 as shown in FIG. 10B. When the atmospheric pressure variation is greater than the second threshold value, the electronic device 400 may perform a function that corresponds to the icon displayed in the specific area 1010 and corresponds to the atmospheric pressure variation. The electronic device 400 may display a screen for setting a date on the display unit 460 as shown in FIG. 10C. When the atmospheric pressure variation is less than or equal to the first threshold value, the electronic device 400 may perform a function that corresponds to the icon displayed in the specific area 1010 and may display the same on the display unit 460.

Figure 11:
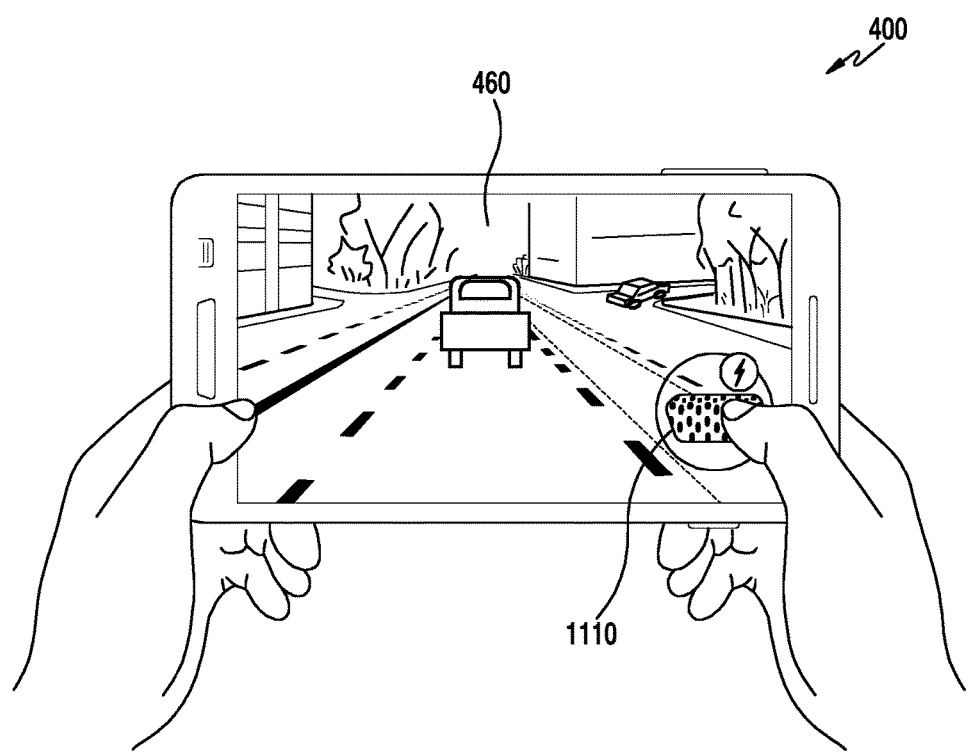
FIG. 11 illustrates a screen that is changed according to a touch input in an electronic device, according to an embodiment of the present disclosure.

FIG. 11 illustrates a screen that is changed according to a touch input in an electronic device, according to an embodiment of the present disclosure.

Referring to FIG. 11, the electronic device 400 may be a smart phone. As shown in FIG. 11, a touch input may be generated in a specific area 1110 of the display unit 460 on which a running car racing game screen is displayed. When the touch input is detected, the electronic device 400 may identify the touch location where the touch input is generated, and may identify the area containing the touch location among a plurality of areas of the display unit 460 virtually divided as shown in FIGS. 7A-7D. From information sensed by the barometric sensor 440 included in the sensor unit 430, the electronic device 400 may identify an atmospheric pressure value caused by the pressure that is applied to the display unit 460 when the touch input is generated.

According to an embodiment of the present disclosure, the electronic device 400 may calculate an atmospheric pressure variation in the area containing the touch location using a reference atmospheric pressure value allocated to the area containing the touch location and the identified atmospheric pressure value. The electronic device 400 may compare the calculated atmospheric pressure variation with a threshold value set for the area containing the touch location. When the atmospheric pressure variation exceeds the threshold value, the electronic device 400 may perform a function that corresponds to the icon displayed in the specific area 1110 and corresponds to the atmospheric pressure variation. For example, when a variation using the atmospheric pressure value generated in the specific area 1110 in which an icon for adjusting the speed of the car is displayed on the running car racing game screen exceeds the threshold value, the electronic device 400 may increase the speed of the car by a set speed. For example, when the variation corresponding to the specific area 1110 is less than or equal to the threshold value, the electronic device 400 may progress the car racing game while maintaining the speed of the car at a preset speed of 80 km/h. When the variation corresponding to the specific area 1110 exceeds the threshold value, the electronic device 400 may progress the car racing game by changing the speed of the car to 100 km/h. In addition, when the variation corresponding to the specific area 1110 exceeds another threshold value, the electronic device 400 may progress the car racing game by changing the speed of the car to 120 km/h.

Figure 12:
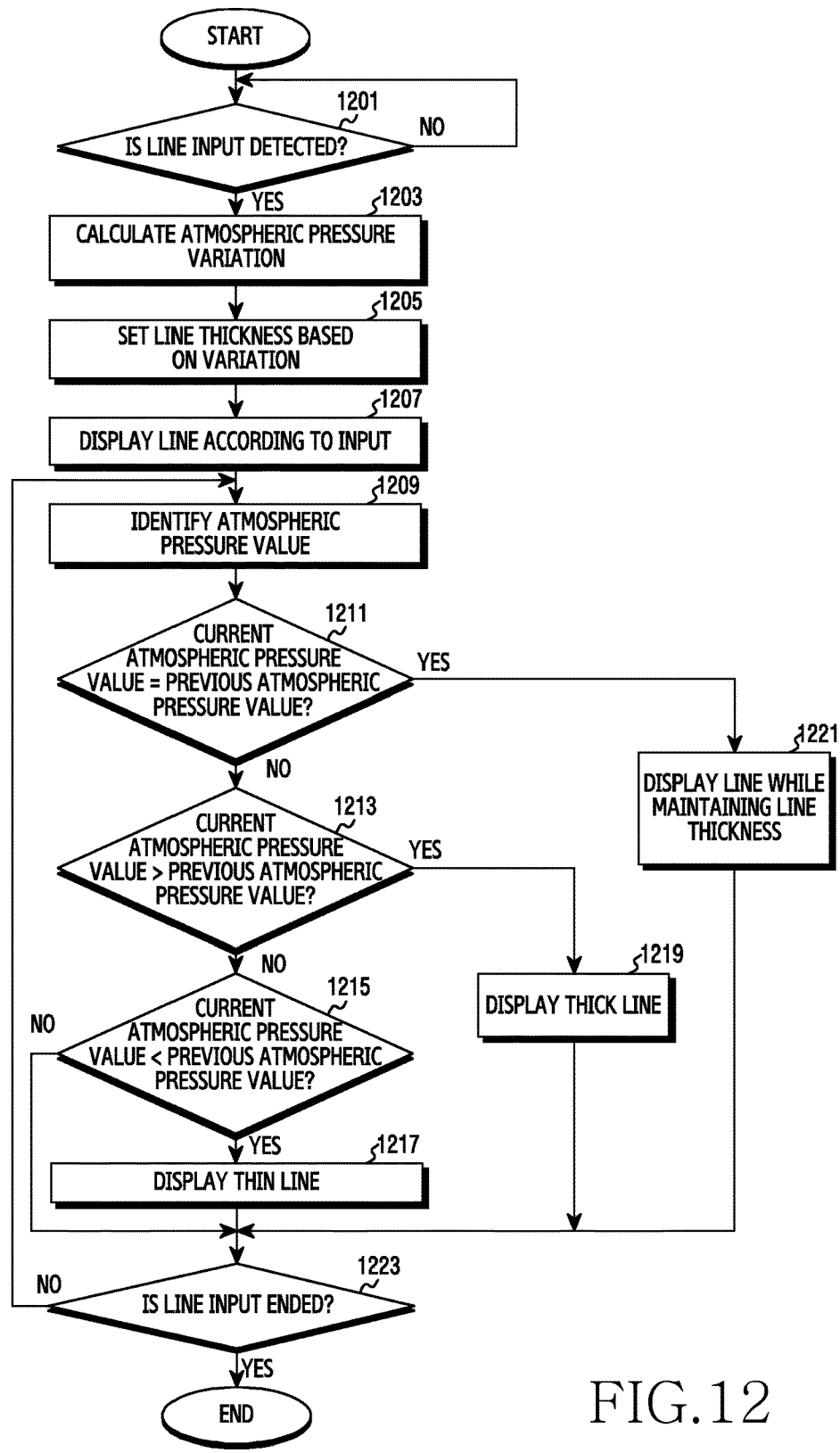
FIG. 12 is a flowchart of an operation of displaying a line by controlling the line thickness according to a touch input in an electronic device, according to an embodiment of the present disclosure.

FIG. 12 is a flowchart of an operation of displaying a line by controlling the line thickness according to a touch input in an electronic device, according to an embodiment of the present disclosure.

Referring to FIG. 12, when a touch input for drawing a line on the display unit 460 is detected in step 1201, the electronic device 400 performs step 1203. In step 1203, the electronic device 400 calculates an atmospheric pressure variation according to the touch input. The electronic device 400 may identify the touch location where the touch input (for example, a drag input) is detected on the display unit 460. For example, the electronic device 400 may identify the touch location where the touch input is detected and the area containing the touch location among a plurality of areas of the display unit 460 virtually divided as illustrated in FIGS. 7A-7D. The electronic device 400 may identify an atmospheric pressure value caused by the pressure that is applied to the display unit 460 when the touch input is generated. The electronic device 400 may calculate the atmospheric pressure variation using a reference atmospheric pressure value that is allocated, as shown in FIG. 8, to the area containing the touch location and the identified atmospheric pressure value. In step 1205, the electronic device 400 compares the calculated variation and a threshold value set by Table 1 to set the thickness of a line to be displayed on the display unit 460 according to the drag.

According to an embodiment of the present disclosure, the electronic device 400 displays the line with the set thickness on the display unit 460 according to the drag in step 1207. The electronic device 400 identifies the atmospheric pressure value according to the drag in real time or periodically in step 1209. When the current atmospheric pressure value is equal to the previous atmospheric pressure value in step 1211, the electronic device 400 performs step 1221. In step 1221, the electronic device 400 displays the line on the display unit 460 according to the drag while maintaining the line thickness set in step 1205, and the electronic device 400 performs step 1223. When the current atmospheric pressure value is not equal to the previous atmospheric pressure value in step 1211, the electronic device 400 performs step 1213. When the current atmospheric pressure value is greater than the previous atmospheric pressure value in step 1213, the electronic device 400 performs step 1219. In step 1219, the electronic device 400 makes the line thickness thicker to display the line on the display unit 460 according to the drag, and the electronic device 400 performs step 1223. The electronic device 400 may make the line thickness thicker by the difference between the current atmospheric pressure value and the previous atmospheric pressure value.

According to an embodiment of the present disclosure, when the current atmospheric pressure value is less than the previous atmospheric pressure value in step 1213, the electronic device 400 performs step 1217. In step 1217, the electronic device 400 makes the line thickness thinner to display the line on the display unit 460 according to the drag, and the electronic device 400 performs step 1223. The electronic device 400 may make the line thickness thinner by the difference between the current atmospheric pressure value and the previous atmospheric pressure value. When the current atmospheric pressure value is not less than the previous atmospheric pressure value in step 1213, the electronic device 400 performs step 1223. When the touch input for inputting the line ends in step 1223, the electronic device 400 ends the process, and when the touch input does not end, the electronic device 400 returns to step 1209 to repeat the process.

Figure 13:
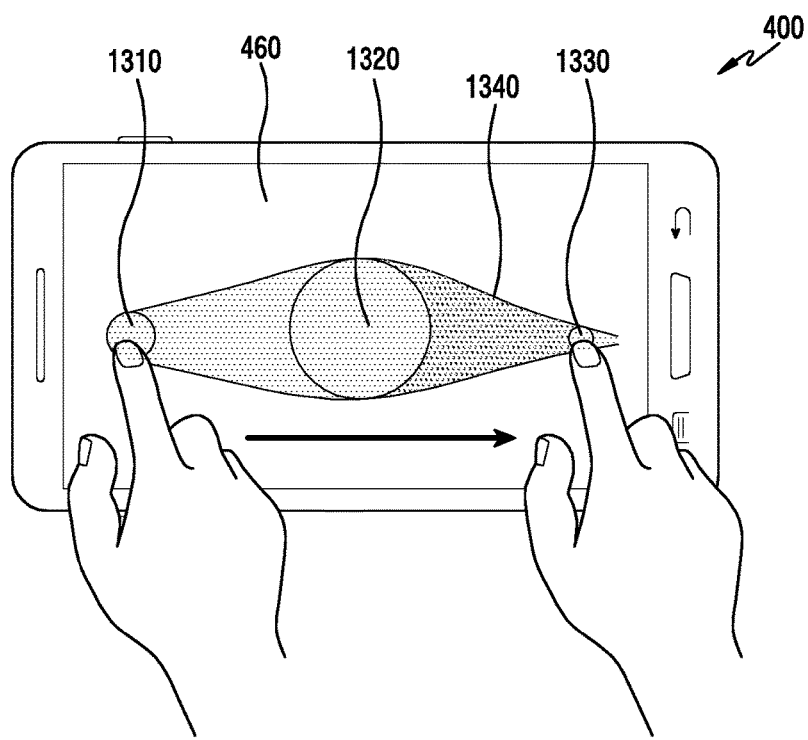
FIG. 13 illustrates a screen for displaying a line by controlling the line thickness according to a touch input in the electronic device, according to the other embodiment of the present disclosure.

FIG. 13 illustrates a screen for displaying a line by controlling the line thickness according to a touch input in the electronic device, according to an embodiment of the present disclosure.

Referring to FIG. 13, the electronic device 400 may be a smart phone. As shown in FIG. 13, the electronic device 400 may display a line 1340 on the display unit 460 thereof as a finger moves in the direction of an arrow. When a touch input for drawing a line is detected, the electronic device 400 may display the line according to the touch input, for example, a drag. The electronic device 400 may display the line according to the touch input on the display unit 460. The electronic device 400 may calculate an atmospheric pressure variation according to the touch input. The electronic device 400 may identify the touch location where the touch input is detected on the display unit 460. For example, the electronic device 400 may identify the touch location where the touch input is detected and the area containing the touch location among a plurality of areas of the display unit 460 virtually divided as illustrated in FIGS. 7A-7D. The electronic device 400 may identify an atmospheric pressure value corresponding to the touch input. The electronic device 400 may calculate the atmospheric pressure variation using a reference atmospheric pressure value that is allocated, as shown in FIG. 8, to the area containing the touch location and the identified atmospheric pressure value. The electronic device 400 may compare the calculated variation and a threshold value set by Table 1 to set a first thickness 1310 of the line.

According to an embodiment of the present disclosure, the electronic device 400 may display, on the display unit 460, the line having the first thickness 1310 according to the first touch input. The electronic device 400 may compare the current atmospheric pressure value, which is identified while the touch input continues, and the previously identified atmospheric pressure value in real time or periodically. When the current atmospheric pressure value is equal to the previous atmospheric pressure value, the electronic device 400 may continue to draw the line with the first thickness 1310. When the current atmospheric pressure value is greater than the previous atmospheric pressure value, the electronic device 400 may draw the line with a second thickness 1320. When the current atmospheric pressure value is less than the previous atmospheric pressure value, the electronic device 400 may draw the line with a third thickness 1330. In this case, the first thickness 1310 may be less than the second thickness 1320 and greater than the third thickness 1330.

An operating method for an electronic device, according to an embodiment of the present disclosure, includes receiving, by the electronic device 400, a touch input caused by pressing a part of a display unit 460, wherein the electronic device 400 includes a housing 410 having an inner space, the touch screen display 460 exposed through one surface of the housing 410, and a sensor 440 configured to detect an atmospheric pressure variation within the inner space, monitoring, by the electronic device 400, the atmospheric pressure variation using the sensor 440 while receiving the touch input, and providing, by the electronic device 400, a changed and/or selected function of the display unit 460 based at least in part on the monitored atmospheric pressure variation and the touch input.

The operation of providing the selected function includes comparing the atmospheric pressure variation with a selected threshold value, and performing the selected function based at least in part on the comparison result.

The operation of providing the selected function further includes performing the selected function based on the variation and the location of the touch input when the variation is greater than the threshold value.

The operation of providing the selected function further includes performing the selected function based on the location of the touch input irrespective of the variation when the variation is less than the threshold value.

The operating method further includes dividing a touch panel contained in the display unit 460 into a plurality of sub-areas, and setting at least two of the plurality of sub-areas to have different threshold values for the atmospheric pressure variation.

The operation of comparing the atmospheric pressure variation and the selected threshold value includes identifying the location on the touch panel based on the touch input, determining a first sub-area containing the determined location among the plurality of sub-areas, and comparing a threshold value associated with the first sub-area and the atmospheric pressure variation.

The embodiments of the present disclosure disclosed herein and shown in the drawings are certain examples presented in order to describe technical details of the present disclosure and to help in the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure as defined by the appended claims and their equivalents.

What is claimed is:

1. An electronic device, comprising:
   a housing;
   a touch screen display comprising a touch panel, the touch screen display being located within the housing and exposed through at least a part of the housing;
   a sensor provided within the housing and configured to detect an atmospheric pressure;
   a processor operatively coupled with the touch screen display and the sensor; and
   a memory operatively coupled with the processor,
   wherein the memory stores instructions, which when executed by the processor, cause the processor to:
   display a visual object on the touch screen display,
   receive an input pressing the visual object being displayed,
   in response to receiving the input, obtain a pressing strength of the input, based on data indicating an atmospheric pressure variation caused by receiving the input, and
   in response to obtaining the pressing strength, execute, among a plurality of functions executable through the visual object, a first function, based on identifying that the pressing strength of the input is within a first designated range, and execute, among the plurality of functions, a second function, which is distinct from the first function, based on identifying that the pressing strength of the input is within a second designated range, which is distinct from the first designated range.

2. The electronic device of claim 1, wherein the sensor comprises an atmospheric pressure sensor.

3. The electronic device of claim 1, wherein the touch panel comprises a plurality of sub-areas, and
   wherein at least two of the plurality of sub-areas have different threshold values for the atmospheric pressure variation.

4. The electronic device of claim 3, wherein the instructions, when executed by the processor, cause the processor to:
   determine a location on the touch panel based on the input,
   determine a sub-area containing the determined location among the plurality of sub-areas, and
   execute a third function, based on the atmospheric pressure variation detected by the sensor while receiving the input being within a designated range associated with the sub-area.

5. The electronic device of claim 1, wherein the instructions, when executed by the processor, cause the processor to execute a third function among the plurality of functions executable through the visual object, based on identifying that the pressing strength of the input is outside of the first designated range and the second designated range.

6. The electronic device of claim 1, wherein the instructions, when executed by the processor, cause the processor to execute a third function based on a location of the input, irrespective of the atmospheric pressure variation.

7. The electronic device of claim 1, wherein the housing comprises:
a first plate extending in a first direction,
a second plate extending in a second direction opposite to the first direction, and
a side member configured to surround a space between the first plate and the second plate.

8. The electronic device of claim 7, wherein the sensor is located in at least one area of the space between the first plate and the second plate, and
wherein the at least one area of the space between the first plate and the second plate is at least partially sealed.

9. An electronic device, comprising:
a housing;
a connecting member connected to the housing and detachably mounted on a part of a user's body;
a touch screen display comprising a touch panel, the touch screen display being located within the housing and exposed through at least a part of the housing;
a pressure sensor provided within the housing and configured to detect an atmospheric pressure;
a processor operatively coupled with the touch screen display and the atmospheric pressure sensor; and
a memory operatively coupled with the processor,
wherein the memory stores instructions, which when executed by the processor, cause the processor to:
receive an input pressing a visual object being displayed on the touch screen display,
in response to receiving the input, obtain a pressing strength of the input, based on data indicating an atmospheric pressure variation caused by receiving the input, and
in response to obtaining the pressing strength, execute, among a plurality of functions executable through the visual object, a first function, based on identifying that the pressing strength of the input is within a first designated range, and execute, among the plurality of functions, a second function distinct from the first function, based on identifying that the pressing strength of the input is within a second designated range distinct from the first designated range.

10. The electronic device of claim 9, wherein the touch panel comprises a plurality of sub-areas, and
wherein at least two of the plurality of sub-areas have different designated ranges for the atmospheric pressure variation.

11. An operating method for an electronic device, the operating method comprising:
displaying, by the electronic device, a visual object on a touch screen display, wherein the electronic device comprises a housing having an inner space, the touch screen display exposed through one surface of the housing, and a sensor configured to detect an atmospheric pressure variation within the inner space;
receiving, by the electronic device, an input pressing the visual object being displayed;
in response to receiving the input, obtaining a pressing strength of the input, based on data indicating an atmospheric pressure variation caused by receiving the input: and
in response to obtaining the pressing strength, executing, among a plurality of functions executable through the visual object, a first function, based on identifying that the pressing strength of the input is within a first designated range, and executing, among the plurality of functions, a second function, which is distinct from the first function, based on identifying that the pressing strength of the input is within a second designated range, which is distinct from the first designated range.

12. The operating method of claim 11, further comprising executing a third function among the plurality of functions executable through the visual object, based on identifying that the pressing strength of the is outside of the first designated range and the second designated range.

13. The operating method of claim 11, further comprising providing a fourth function associated with the visual object, based on a location of the input, irrespective of the atmospheric pressure variation.

14. The operating method of claim 11, further comprising:
dividing a touch panel included in the touch screen display into a plurality of sub-areas; and
setting at least two of the plurality of sub-areas to have different designated ranges of atmospheric pressure variation.

15. The operating method of 14, wherein providing the first function comprises:
identifying a location on the touch panel based on the input;
determining a sub-area including the determined location among the plurality of sub-areas; and
executing a third function, based on the atmospheric pressure variation detected by the sensor while receiving the input is within a designated range associated with the sub-area.

* * * * *